United States Patent
Thibault et al.

(10) Patent No.: US 10,377,446 B2
(45) Date of Patent: Aug. 13, 2019

(54) REAR SUSPENSION ASSEMBLY FOR A SNOWMOBILE

(71) Applicant: BOMBARDIER RECREATIONAL PRODUCTS INC., Valcourt (CA)

(72) Inventors: Sebastien Thibault, Sherbrooke (CA); Berthold Fecteau, Richmond (CA); Gabriel Dessureault, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 233 days.

(21) Appl. No.: 14/555,622

(22) Filed: Nov. 27, 2014

(65) Prior Publication Data

US 2015/0251727 A1 Sep. 10, 2015

Related U.S. Application Data

(60) Provisional application No. 61/910,232, filed on Nov. 29, 2013.

(51) Int. Cl.
*B62M 27/02* (2006.01)
(52) U.S. Cl.
CPC ....... *B62M 27/02* (2013.01); *B62M 2027/026* (2013.01)
(58) Field of Classification Search
CPC .................................................... B62M 27/02
USPC ......... 180/9.5, 193, 190; 305/120, 127, 128, 305/141
See application file for complete search history.

(56) References Cited

U.S. PATENT DOCUMENTS

| | | | |
|---|---|---|---|
| 4,305,476 A * | 12/1981 | Blass | B62D 55/30 180/9.54 |
| 5,692,579 A | 12/1997 | Peppel | |
| 5,881,834 A | 3/1999 | Karpik | |
| 6,206,124 B1 | 3/2001 | Mallette et al. | |
| RE38,124 E | 5/2003 | Mallette et al. | |
| 7,360,618 B2 | 4/2008 | Hibbert | |
| 7,854,285 B1 * | 12/2010 | Giese | 180/190 |
| 7,975,794 B2 * | 7/2011 | Simmons | B60G 11/14 180/193 |
| 8,151,923 B1 | 4/2012 | Giese | |
| 9,145,037 B2 | 9/2015 | Hawksworth | |
| 2004/0173390 A1 | 9/2004 | Karpik | |

(Continued)

OTHER PUBLICATIONS

Arc, Skinz Protective Gear, Adjustable Remote Coupling; https://www.youtube.com/watch?feature=player_embedded&v=P3S0o8d8n0I; published on Jul. 9, 2013. Retrieved from youtube on Dec. 5, 2014.

(Continued)

*Primary Examiner* — Jacob D Knutson
(74) *Attorney, Agent, or Firm* — BCF LLP

(57) ABSTRACT

A rear suspension assembly for a snowmobile has a front suspension arm, a rear suspension arm, a pair of slide rails, at least one shock absorber, and at least one suspension coupler. The at least one suspension coupler couples the rear suspension arm with the front suspension arm. The at least one suspension coupler generates a coupling force to continuously couple the front and rear suspension arms with each other during a full range of movement between the fully extended position and the fully compressed position. A snowmobile having the rear suspension assembly is also disclosed.

31 Claims, 9 Drawing Sheets

(56) References Cited

U.S. PATENT DOCUMENTS

| | | | | |
|---|---|---|---|---|
| 2004/0195023 | A1* | 10/2004 | Yoshihara | B62D 55/07 180/193 |
| 2005/0016784 | A1* | 1/2005 | Fecteau | B62K 25/06 180/182 |
| 2012/0205173 | A1* | 8/2012 | Mallette | B62M 27/02 180/193 |
| 2013/0270020 | A1* | 10/2013 | Gagnon | B62M 27/02 180/193 |

OTHER PUBLICATIONS

Skinz Protective Gear, Technical Insights With Jake, Arc; https://www.youtube.com/watch?v=5Y2c-tkANKY&feature=player_embedded; published on Dec. 22, 2013. Retrieved from youtube on Dec. 5, 2014.

Skinz Protective Gear—Arc Electronic; https://www.youtube.com/watch?feature=player_embedded&v=skl6hjEJoBl; published on Jun. 7, 2014. Retrieved from youtube on Dec. 5, 2014.

Skinz Protective Gear; http://www.skinzprotectivegear.com/snowmobileproductad/arc.html; Paynesville, Minnesota, USA; Retrieved from the Internet on Dec. 8, 2014.

Hawksworth et al. U.S. Appl. No. 61/829,418, filed May 31, 2013, titled "Remotely Adjustable Suspension Coupling".

Teamfast.com, Blog 3—Independent vs. coupled suspensions, Aug. 2, 2011, retrieved from http://67.20.122.154/news/blog/blog-3-independent-vs-coupled-suspensions on Jul. 18, 2018.

Timbersled, 2012 Timbersled Mtn Tamer Snowmobile Back Suspension Review, Jul. 7, 2011, screenshots retrieved from https://www.youtube.com/watch?v=mUWE3ITfBcl on Jul. 18, 2018.

Hartman, Inc., Complete Light Weight Bolt in Skid Suspension Kits, updated Jul. 20, 2016, retrieved from http://www.hartmaninc.com/suspension.html on Jul. 18, 2018.

Dootalk.com, Selling Snowmobile Ride Height, Oct. 15, 2012, retrieved from https://www.dootalk.com/content/showarticle.php?ID=120 on Jul. 18, 2018.

* cited by examiner

REAR SUSPENSION ASSEMBLY FOR A SNOWMOBILE

CROSS-REFERENCE

The present application claims priority to U.S. Provisional Patent Application No. 61/910,232, filed Nov. 29, 2013, the entirety of which is incorporated herein by reference.

FIELD OF TECHNOLOGY

The present technology relates to a rear suspension assembly for a snowmobile.

BACKGROUND

Snowmobiles are driven by endless drive tracks supported and tensioned by rear suspension assemblies. Many such rear suspension assemblies have front and rear suspension arms and one or more shock absorbers that are connected between the tunnel of the snowmobile and a slide frame of the rear suspension assembly. The manner in which the slide frame, and therefore the track, moves over bumps and recesses as the snowmobile is in movement depends of the geometry of the rear suspension assembly.

Some geometries result in what is known as an uncoupled rear suspension assembly. In an uncoupled rear suspension assembly, the front and rear portions of the slide frame move independently from each other. For example, when the snowmobile moves forward and the rear suspension assembly encounters a bump, the front portion of the slide frame moves toward the tunnel while the rear portion of the slide frame will not move toward the tunnel until it also encounters the bump. In an uncoupled rear suspension assembly, the slide frame can pivot relative to the tunnel as seen from the side of the snowmobile.

Some other geometries result in what is known as a coupled rear suspension assembly. In a coupled rear suspension assembly, the front and rear portions of the slide frame move substantially together. For example, when the snowmobile moves forward and the rear suspension assembly encounters a bump, the front portion of the slide frame moves toward the tunnel and also pulls the rear portion of the slide frame toward the tunnel even though the rear portion of the of the slide frame has not yet encountered the bump. In a coupled rear suspension assembly, the slide frame moves essentially linearly relative to the tunnel without substantially altering its orientation relative to the tunnel.

As both coupled and uncoupled rear suspension assemblies have advantages, some snowmobiles have a rear suspension assembly that acts like an uncoupled rear suspension assembly from a fully extended position of the rear suspension assembly to a predetermined intermediate position of the rear suspension assembly and acts like a coupled rear suspension assembly from the predetermined intermediate position of the rear suspension assembly to a fully compressed position of the rear suspension assembly. In some of these rear suspension assemblies, stoppers are provided such that a portion of the rear suspension assembly abuts these stoppers when the rear suspension assembly reaches the predetermined intermediate position as it moves toward the fully compressed position. When this happens, the stoppers reduce the degrees of freedom of movement of the rear suspension assembly suddenly changing the rear suspension assembly from being an uncoupled rear suspension assembly to being a coupled rear suspension assembly. United States Patent RE38,124, reissued May 27, 2003, and U.S. Pat. No. 6,206,124, issued Mar. 27, 2001, the entirety of both of which is incorporated herein by reference, describe rear suspension assemblies of this type. However this sudden change can be felt by the driver and, if applicable, the passenger(s) of the snowmobile which can be a source of mild discomfort or annoyance. Also, the impacts with the stoppers require that some of the parts of the rear suspension assembly need to be large and robust enough to resist the repeated impacts.

There is therefore a need for a rear suspension assembly for a snowmobile that can vary the degree of coupling of the rear suspension assembly.

SUMMARY

It is an object of the present technology to ameliorate at least some of the inconveniences present in the prior art.

According to one implementation of the present technology, there is provided a snowmobile having a chassis including a tunnel having a longitudinal direction, an engine connected to the chassis, at least one ski connected to the chassis by a front suspension, an endless drive track disposed below the tunnel and operatively connected to the engine for propulsion of the snowmobile, and a rear suspension assembly supporting and tensioning the endless drive track. The rear suspension assembly has a fully extended position and a fully compressed position. The rear suspension assembly includes a front suspension arm having an upper end and a lower end, the upper end of the front suspension arm being pivotally connected to the tunnel, a rear suspension arm having an upper end and a lower end, the upper end of the rear suspension arm being pivotally connected to the tunnel, a pair of slide rails pivotally connected to the lower end of the front suspension arm and to the lower end of the rear suspension arm, at least one shock absorber connected between the tunnel and the pair of slide rails, the at least one shock absorber biasing the pair of slide rails away from the tunnel, and at least one suspension coupler coupling the rear suspension arm with the front suspension arm. The at least one suspension coupler generating a coupling force to continuously couple the front and rear suspension arms with each other during a full range of movement between the fully extended position and the fully compressed position.

In some implementations of the present technology, the coupling force increases as the rear suspension assembly moves from the fully extended position to the fully compressed position.

In some implementations of the present technology, the coupling force increases progressively as the rear suspension assembly moves from the fully extended position to the fully compressed position.

In some implementations of the present technology, the coupling force increases linearly as the rear suspension assembly moves from the fully extended position to the fully compressed position.

In some implementations of the present technology, the at least one suspension coupler includes at least one torsion spring.

In some implementations of the present technology, the rear suspension assembly further includes a cross bar extending between the pair of slide rails. The at least one torsion spring is disposed around the cross bar and is pivotable around the cross bar.

In some implementations of the present technology, the cross bar is a first cross bar. A second cross bar extends between the pair of slide rails. The at least one torsion spring has a first end abutting the rear suspension arm and a second end abutting the second cross bar.

In some implementations of the present technology, the second cross bar defines at least one cam. The second end of the at least one torsion spring abuts the at least one cam. The at least one cam is movable to adjust a magnitude of the coupling force.

In some implementations of the present technology, the rear suspension assembly also includes a rocker arm having a first end pivotally connected to the lower end of the rear suspension arm and a second end pivotally connected to the pair of slide rails. The at least one suspension coupler biases the first end of the rocker arm toward a front of the snowmobile.

According to another implementation of the present technology, there is provided a rear suspension assembly for a snowmobile having a front suspension arm having an upper end and a lower end, a rear suspension arm having an upper end and a lower end, a pair of slide rails, at least one shock absorber, and at least one suspension coupler. The upper end of the front suspension arm is configured to be pivotally connected to a tunnel of the snowmobile. The upper end of the rear suspension arm is configured to be pivotally connected to the tunnel. The pair of slide rails is pivotally connected to the lower end of the front suspension arm and to the lower end of the rear suspension arm. The at least one shock absorber is configured to be connected to the tunnel and is connected to the pair of slide rails. The at least one shock absorber is configured to bias the pair of slide rails away from the tunnel. The at least one suspension coupler couples the rear suspension arm with the front suspension arm. The at least one suspension coupler generates a coupling force to continuously couple the front and rear suspension arms with each other during a full range of movement between the fully extended position and the fully compressed position.

In some implementations of the present technology, the coupling force increases as the rear suspension assembly moves from the fully extended position to the fully compressed position.

In some implementations of the present technology, the coupling force increases progressively as the rear suspension assembly moves from the fully extended position to the fully compressed position.

In some implementations of the present technology, the coupling force increases linearly as the rear suspension assembly moves from the fully extended position to the fully compressed position.

In some implementations of the present technology, the at least one suspension coupler includes at least one torsion spring.

In some implementations of the present technology, a cross bar extends between the pair of slide rails. The at least one torsion spring is disposed around the cross bar and is pivotable around the cross bar.

In some implementations of the present technology, the cross bar is a first cross bar. The rear suspension assembly also has a second cross bar extending between the pair of slide rails. The at least one torsion spring has a first end abutting the rear suspension arm and a second end abutting the second cross bar.

In some implementations of the present technology, the second cross bar defines at least one cam. The second end of the at least one torsion spring abuts the at least one cam. The at least one cam is movable to adjust a magnitude of the coupling force.

In some implementations of the present technology, a rocker arm has a first end pivotally connected to the lower end of the rear suspension arm and a second end pivotally connected to the pair of slide rails. The at least one suspension coupler biases the first end of the rocker arm toward a front of the rear suspension assembly.

According to another aspect of the present technology, there is provided a rear suspension assembly for a snowmobile having a front suspension arm having an upper end and a lower end, a rear suspension arm having an upper end and a lower end, a pair of slide rails, at least one shock absorber, and at least one suspension coupler. The upper end of the front suspension arm is configured to be pivotally connected to a tunnel of the snowmobile. The upper end of the rear suspension arm is configured to be pivotally connected to the tunnel. The pair of slide rails is pivotally connected to the lower end of the front suspension arm and to the lower end of the rear suspension arm. The at least one shock absorber is configured to be connected to the tunnel and is connected to the pair of slide rails. The at least one shock absorber is configured to bias the pair of slide rails away from the tunnel. At least one suspension coupler couples the rear suspension arm with the front suspension arm. The at least one suspension coupler generates a coupling force to couple the front and rear suspension arms with each other at least at the fully extended position and the fully compressed position.

In an additional aspect, the coupling force increases as the rear suspension assembly moves from the fully extended position to the fully compressed position.

In a further aspect, the coupling force increases progressively as the rear suspension assembly moves from the fully extended position to the fully compressed position.

In an additional aspect, the coupling force increases linearly as the rear suspension assembly moves from the fully extended position to the fully compressed position.

In a further aspect, the at least one suspension coupler includes at least one torsion spring.

In an additional aspect, a cross bar extends between the pair of slide rails. The at least one torsion spring is disposed around the cross bar and is pivotable around the cross bar.

In a further aspect, the cross bar is a first cross bar. The rear suspension assembly also has a second cross bar extending between the pair of slide rails. The at least one torsion spring has a first end abutting the rear suspension arm and a second end abutting the second cross bar.

In an additional aspect, the second cross bar defines at least one cam. The second end of the at least one torsion spring abuts the at least one cam. The at least one cam is movable to adjust a magnitude of the coupling force.

In a further aspect, a rocker arm has a first end pivotally connected to the lower end of the rear suspension arm and a second end pivotally connected to the pair of slide rails. The at least one suspension coupler biases the first end of the rocker arm toward a front of the rear suspension assembly.

For purposes of this application, terms related to spatial orientation such as forwardly, rearward, upwardly, downwardly, left, and right, are as they would normally be understood by a driver of the vehicle sitting thereon in a normal riding position. The definitions of terms in the present application take precedence over the definitions of the same terms in documents incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
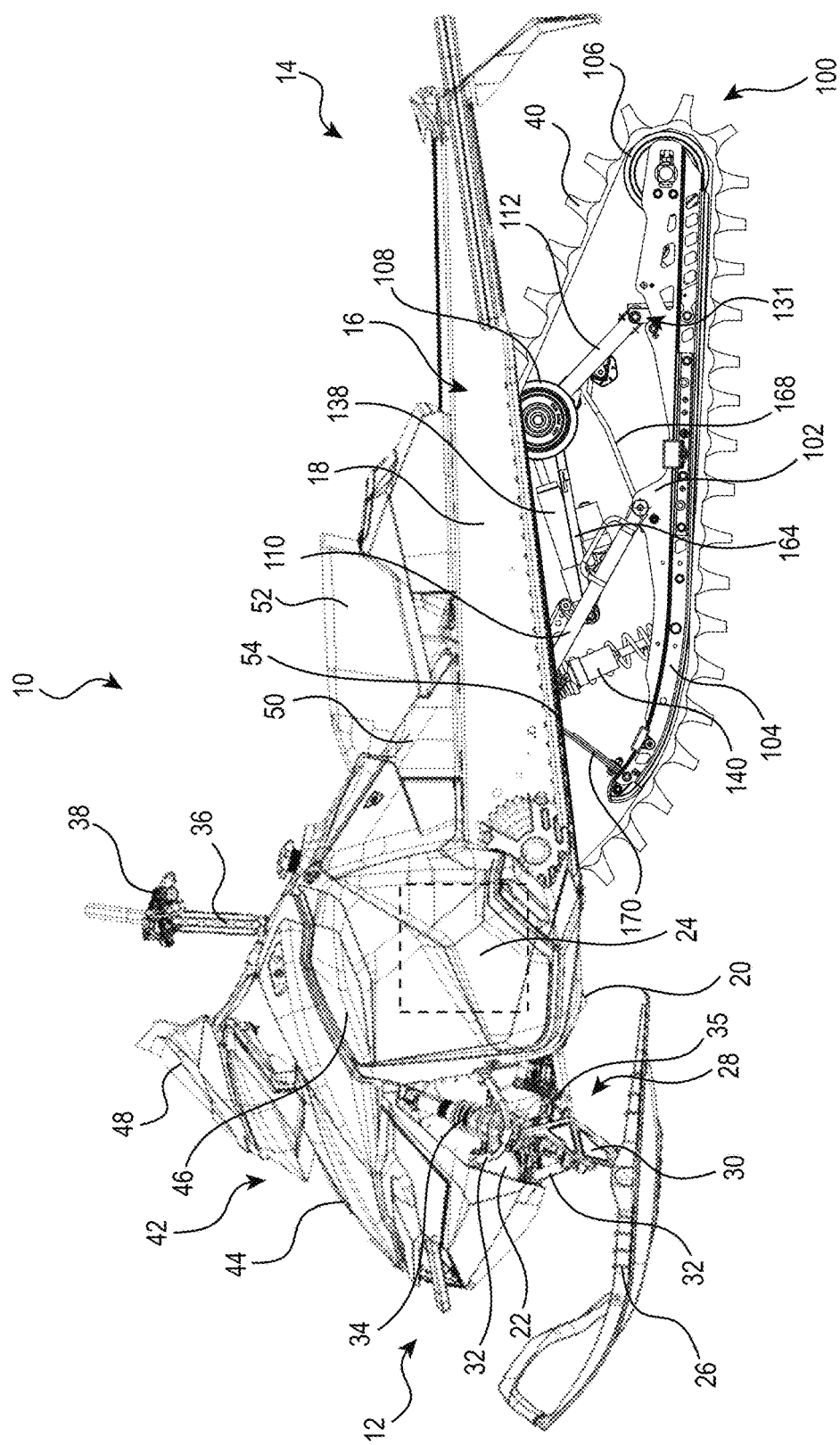
FIG. 1 is a left side elevation view of a snowmobile.
Figure 2:
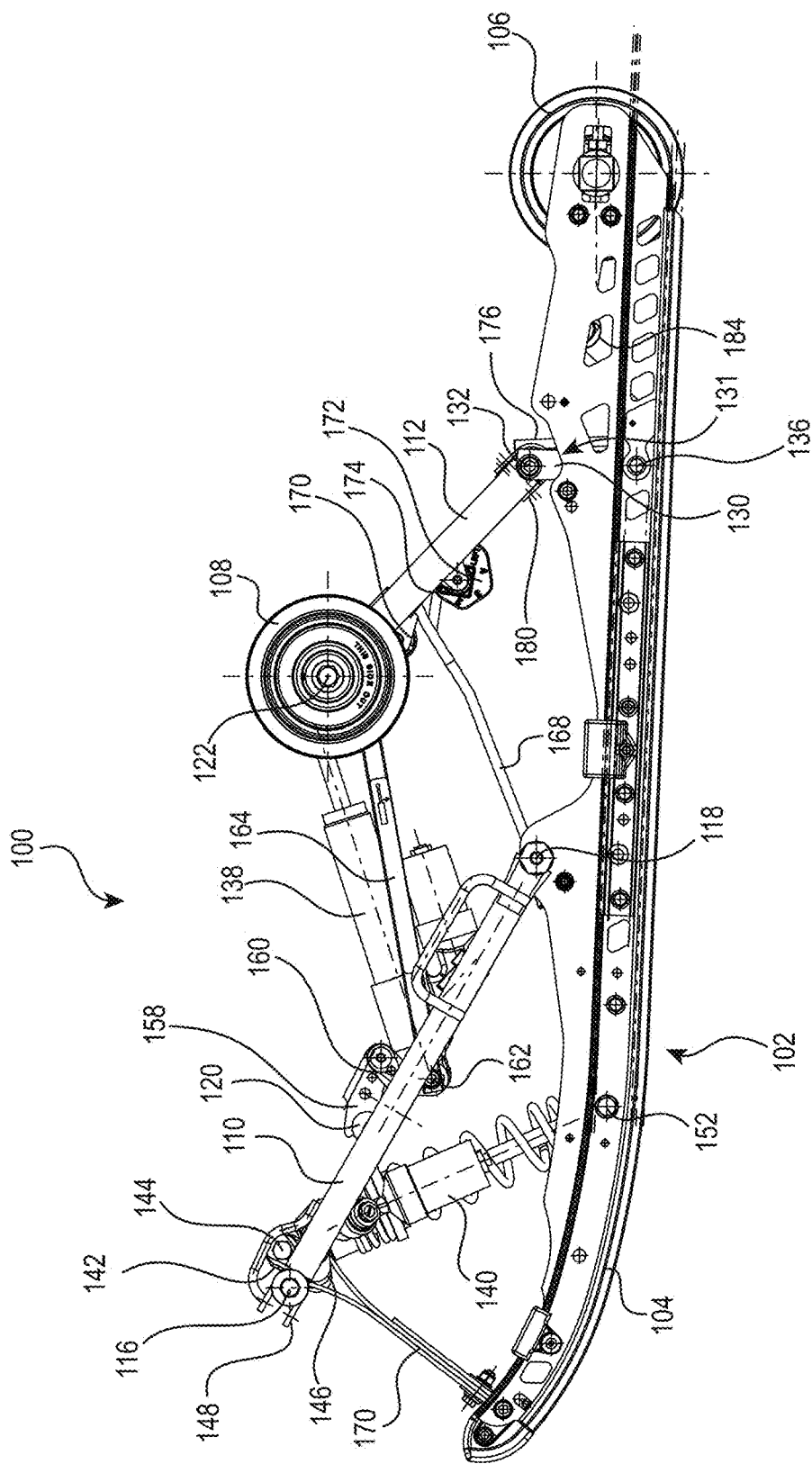
FIG. 2 is a left side elevation view of a rear suspension assembly of the snowmobile of FIG. 1 in a fully extended position.
Figure 3:
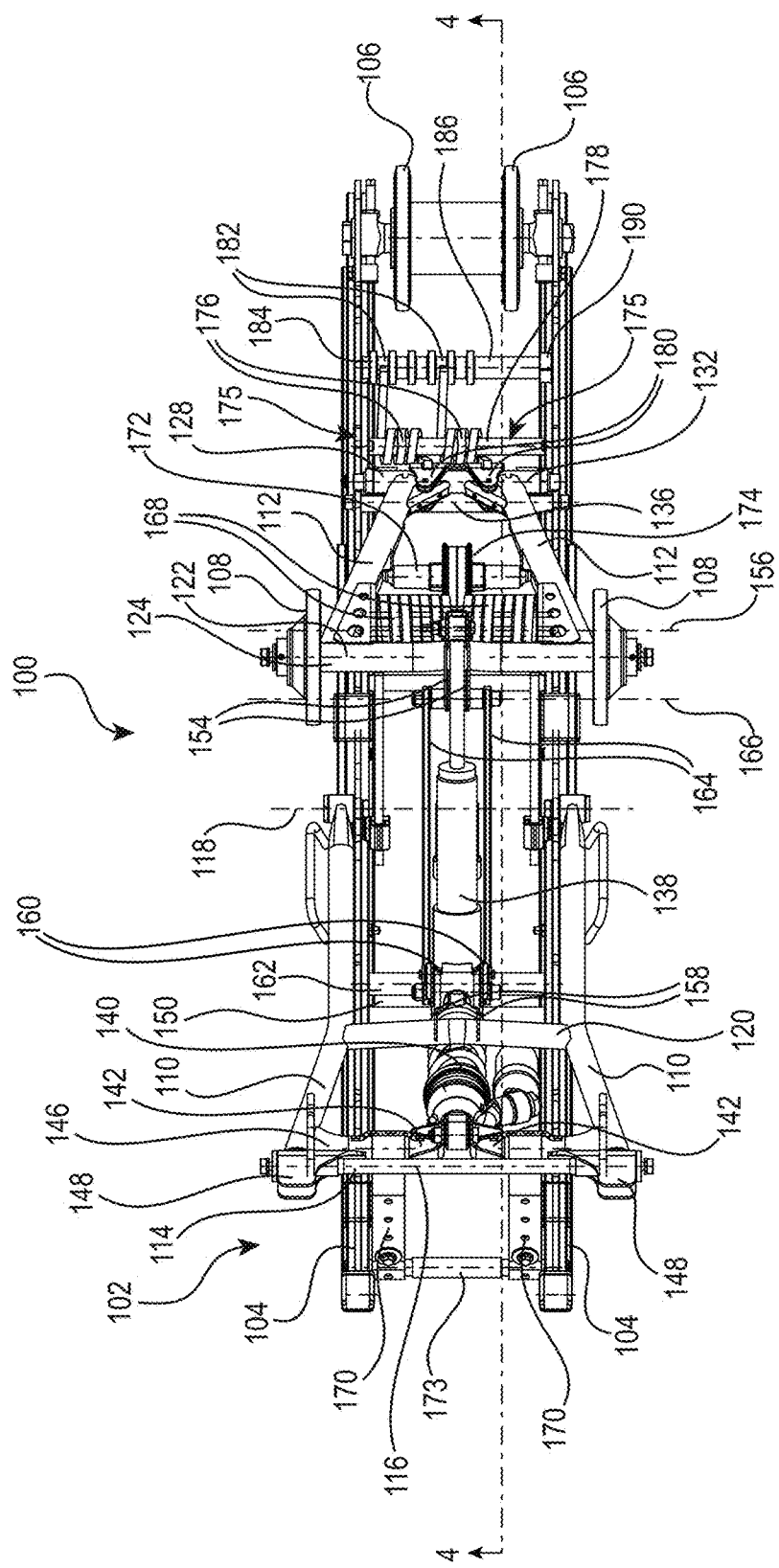
FIG. 3 is a top plan view of the rear suspension assembly of FIG. 2.

A snowmobile 10, shown in FIG. 1, has a front end 12 and a rear end 14 that are defined consistently with the forward travel direction of the vehicle. The snowmobile 10 includes a chassis 16 that includes a tunnel 18, an engine cradle portion 20 and a front suspension assembly portion 22. An engine 24, which is schematically illustrated in FIG. 1, is supported by the engine cradle portion 20 of the chassis 16. Two skis 26 (only the left one of which is shown) are positioned at the front end 12 of the snowmobile 10 and are attached to the front suspension assembly portion 22 of the chassis 16 through front suspension assemblies 28. Each front suspension assembly 28 includes a ski leg 30, a pair of A-arms 32, and a shock absorber 34. Tie rods 35 connect the ski legs 30 to a steering column 36 or an assembly of multiple steering columns. A handlebar 38 is connected to a top of the steering column 36 and is used to steer the skis 26 through the steering column 36, tie rods, and ski legs 30.

An endless drive track 40 is disposed under the tunnel 18. The endless drive track 40 is operatively connected to the engine 24 through a belt transmission system (not shown), such as a continuously variable transmission (CVT), and a reduction drive (not shown). The endless drive track 40 is driven to run about a rear suspension assembly 100 for propelling the snowmobile 10. The rear suspension assembly 100 will be described in greater detail below.

Fairings 42 connected to the front of the chassis 16 provide an external shell that protects the engine 24 and its associated components. The fairings 42 include a hood 44 and side panels 46 that can be opened to allow access to the engine 24 and its associated components when this is required, for inspection or maintenance for example. A windshield 48 is connected to the fairings 42 forward of the handlebar 38. Alternatively, the windshield 48 could be attached directly to the handlebar 38. The windshield 48 acts as a windscreen to lessen the force of the air on the driver while the snowmobile 10 is moving.

A fuel tank 50 is disposed on top of the tunnel 18. A straddle seat 52 is disposed on top of the fuel tank 50. It is contemplated that the straddle seat 52 could be disposed directly on top of the tunnel 18. The straddle seat 52 is configured to receive only a driver thereon. It is contemplated that the straddle seat 52 could be longer in order to also receive one or more passengers thereon. It is also contemplated that another straddle seat could be disposed on the tunnel 18 behind the straddle seat 52 to receive one or more passengers thereon. Two foot rests 54 are positioned on opposite sides of the snowmobile 10 below the straddle seat 52 to accommodate the driver's feet.

Figure 4:
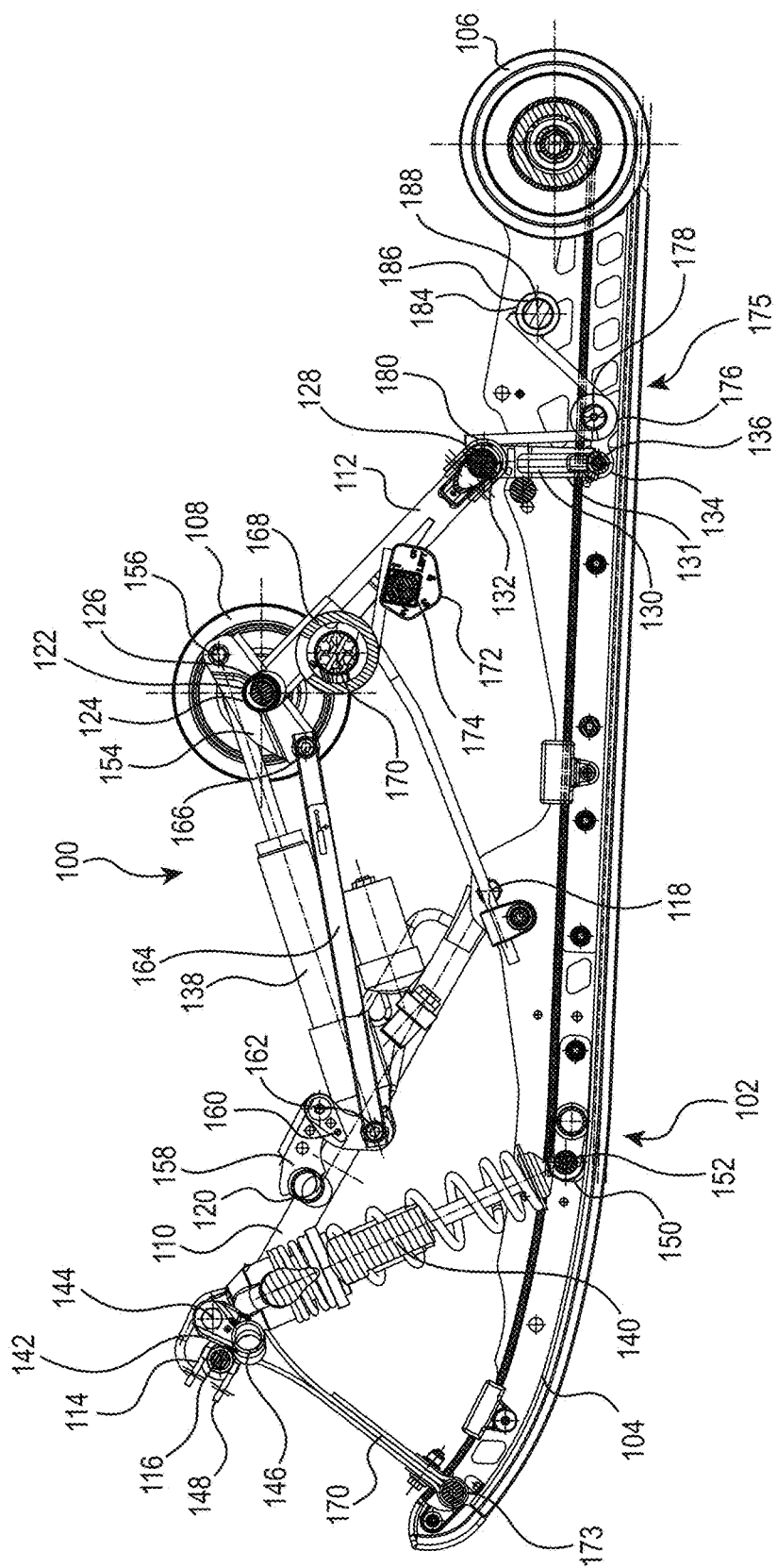
FIG. 4 is a cross-sectional view of the rear suspension assembly of FIG. 2 taken through line 4-4 of FIG. 3.
Figure 5:
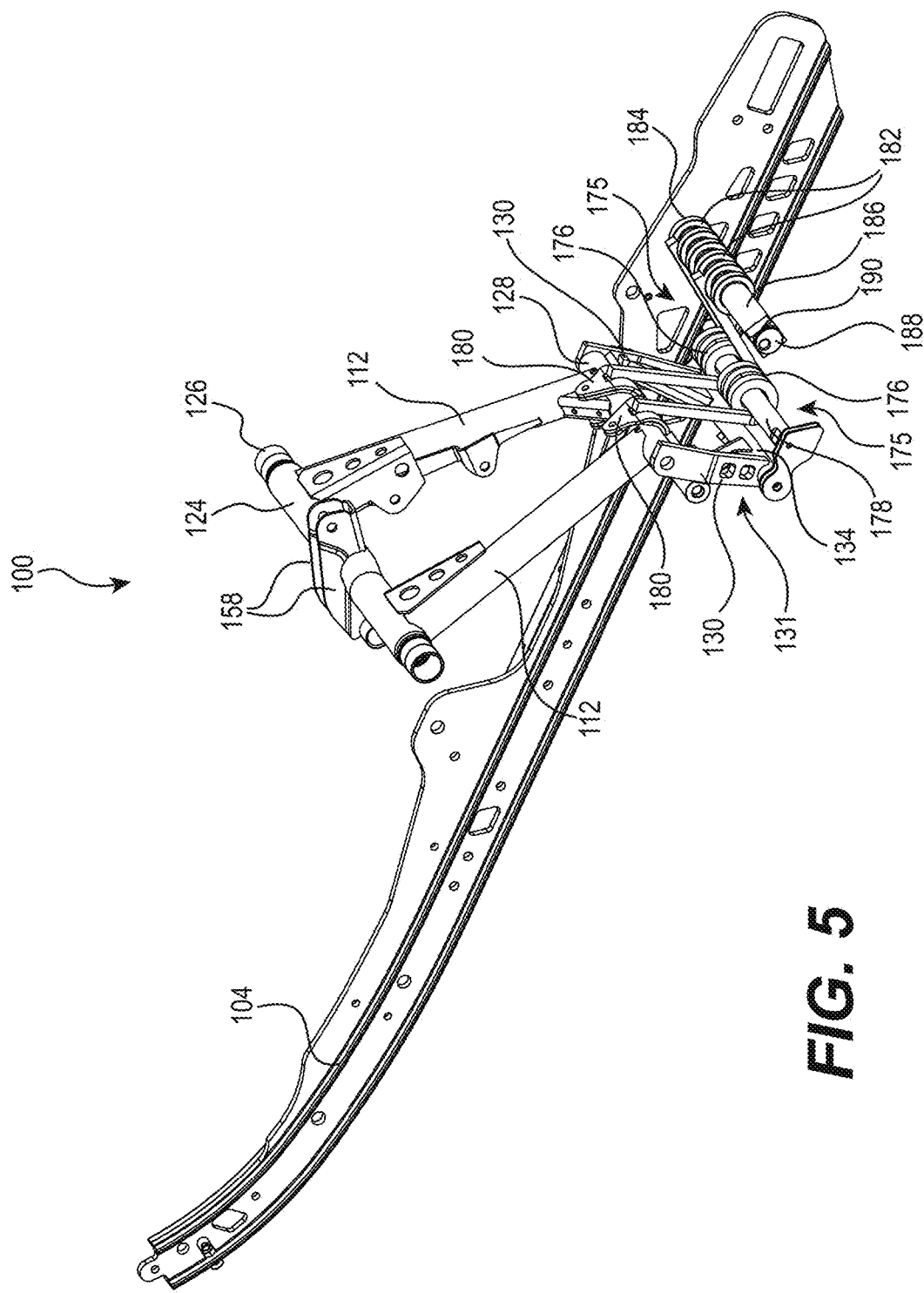
FIG. 5 is a perspective view taken from a rear, left side of some components of the rear suspension assembly of FIG. 2.
Figure 6:
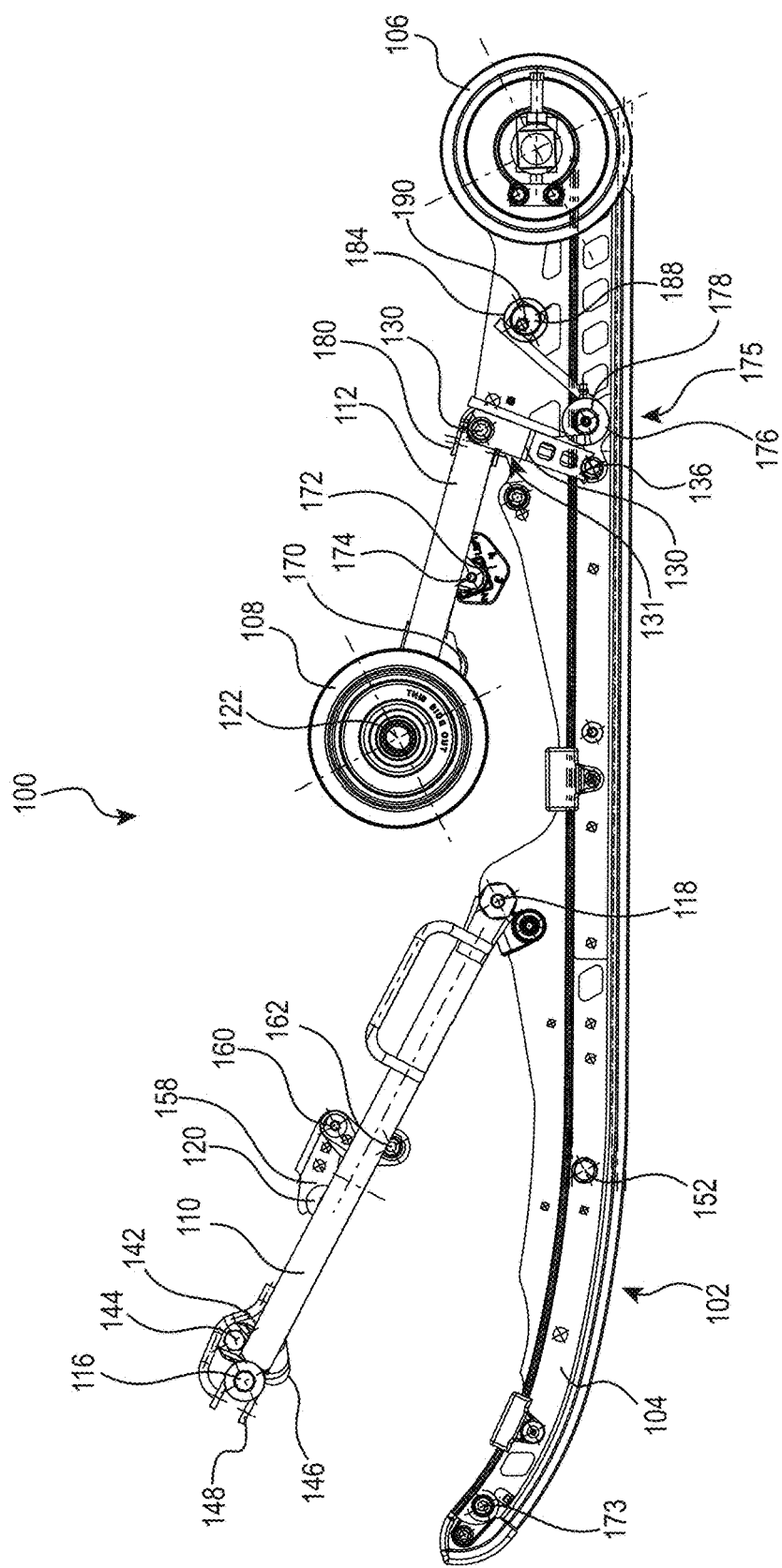
FIG. 6 is a left side elevation view of the rear suspension assembly of FIG. 2 in a partially compressed position, with a left slide rail and some other components removed for clarity.

Turning now to FIGS. 2 to 7, the rear suspension assembly 100 will be described in more detail. The endless drive track 40 is suspended for movement relative to the chassis 16 and is tensioned by the rear suspension assembly 100. The rear suspension assembly 100 is movable between a fully extended position shown in FIGS. 2 to 5 and a fully compressed position shown in FIG. 7. FIG. 6 illustrates one possible position intermediate the fully extended and the fully compressed positions.

The rear suspension assembly 100 has a slide frame assembly 102. The slide frame assembly 102 includes a pair of spaced apart slide rails 104 that engage the inner side of the ground-engaging portion of the endless drive track 40. A plurality of rollers 106 (only some of which are illustrated) are rotationally supported by the slide frame assembly 102. Other rollers 108 are rotationally connected to the tunnel 18. The rollers 106, 108 and the slide rails 104 define the path over which the endless drive track 40 travels.

The rear suspension assembly 100 has left and right front suspension arms 110 and left and right rear suspension arms 112. It is contemplated that the rear suspension assembly 100 could have only a single front suspension arm 110. It is also contemplated that the rear suspension assembly 100 could have only a single rear suspension arm 112.

As can be seen in FIGS. 1 to 4, the front suspension arms 110 extend downwardly and rearward from a front portion of the tunnel 18. The upper ends of the front suspension arms 110 are connected to a shaft 114 that is pivotally attached to the tunnel 18 about a pivot axis 116. The lower ends of the front suspension arms 110 are each pivotally attached to their respective slide rails 104 about a pivot axis 118. A cross-member 120 extends between the front suspension arms 110. In the present implementation, the cross-member 120 is welded to the front suspension arms 110, but it is contemplated that they could be connected to each other by other means. The front suspension arms 110 and the cross-member 120 are made of metal tubes having generally circular cross-sections. It is contemplated that the front suspension arms 110 and the cross-member 120 could have other shapes of cross-sections, and that the front suspension arms 110 and the cross-member 120 could be made of a material other than metal.

As can be seen in FIGS. 1 to 5, the rear suspension arms 112 extend downwardly and rearward from the tunnel 18, and are disposed rearward of the front suspension arms 110. The rear suspension arms 112 are made of metal tubes having generally circular cross-sections. It is contemplated that the rear suspension arms 112 could have other shapes of cross-sections, and that the rear suspension arms 112 could be made of a material other than metal. The rear suspension arms 112 are pivotally attached to the tunnel 18 about a pivot axis 122 by a tube and shaft assembly. The tube and shaft assembly includes a tube 124 rotatably supported by a shaft 126 that is mounted at both ends thereof to the tunnel 18. The tube 124 supports the rollers 108. The upper ends of the rear suspension arms 112 are connected to the shaft 126. The lower ends of the rear suspension arms 112 are fixedly connected to a cross bar 128 (FIG. 5). The cross bar 128 is pivotally connected to left and right arms 130 about a pivot axis 132. The arms 130 together form a rocker arm 131. Each of the left and right arms 130 is connected at its lower end to another cross bar 134 (FIG. 5). The cross bar 134 is pivotally connected between the slide rails 102 about a pivot axis 136.

A rear shock absorber 138 is connected between the front suspension arms 110 and the rear suspension arms 112, as it will be described in greater details below. As can be seen in FIGS. 1 to 4, a front shock absorber assembly 140 disposed between the tunnel 18 and the slide frame assembly 102 extends rearward and downwardly from the front portion of the tunnel 18. The front shock absorber assembly 140 is disposed partially forward of the front suspension arms 110. A lower end of the shock absorber assembly 140 is disposed forward of the lower ends of the front suspension arms 110. The front shock absorber assembly 140 is a damping unit which includes a hydraulic damper and a coil spring for absorbing the impact energy when impact forces are applied to the opposite ends of the damping unit. The coil spring biases the damping unit toward an extended position so that the hydraulic damper is in position to absorb the impact energies. Since shock absorber assemblies of the type of the shock absorber assembly 140 are well known in the art, it will not be further described herein.

The front shock absorber assembly 140 is pivotally connected to brackets 142 about a pivot axis 144. The brackets 142 are fixedly connected, by welding for example, to a shaft 146. U-shaped brackets 148 are disposed at both ends of the shaft 146 and receive the end portions of the shaft 114 therein. As a result, the upper end of the front shock absorber assembly 140 is pivotally connected to the tunnel 18. The front shock absorber assembly 140 is pivotally connected at a lower end thereof to a shaft 150 about a pivot axis 152. The shaft 150 extends between and is fixedly connected to the left and right slide rails 104. The front shock absorber assembly 140 is configured to rotate about the shaft 150.

As can be seen in FIGS. 1 to 4, the rear shock absorber 138 extends forwardly and downwardly from its upper end, and is disposed at least in part rearward of the front suspension arms 110. The rear shock absorber 138 includes a hydraulic damper that is well known in the art, and will therefore not be described in detail herein. The rear shock absorber 138 is operatively connected at its upper end to the tunnel 18 by being pivotally connected to the rear brackets 154 (FIG. 4) mounted on the tube 124 about a pivot axis 156. The rear brackets 154 are fixedly connected to the tube 124.

The lower end of the rear shock absorber 138 is pivotally connected to the front suspension arms 110 via the cross-member 120, left and right bracket arms 158 and left and right links 160. One end of each of the left and right bracket arms 158 is fixedly connected to the cross-member 120. The opposite end of each of the left and right bracket arms 158 is pivotally connected to an end of a corresponding one of the left and right links 160. The opposite ends of the left and right links 160 are pivotally connected to the lower end of the rear shock absorber 138 about a pivot axis 162. The lower end of the rear shock absorber 138 is disposed laterally between the links 160.

Tie rods 164 are disposed on each side of the rear shock absorber 196. A lower end of each of the left and right tie rods 164 is pivotally connected to a corresponding one of the left and right links 160 about the pivot axis 162. An upper end of each of the left and right tie rods 164 is pivotally connected to the rear brackets 154 about a pivot axis 166. As can be seen in FIG. 4, the pivot axes 156 and 166 are disposed on opposite sides of the pivot axis 122 when the rear suspension assembly 100 is in the fully extended position.

Left and right torsion springs 168 are provided in order to push the slide frame assembly 102 away from the tunnel 18, and to maintain the rear shock absorber 138 and the front shock absorber assembly 140 substantially extended when no substantial loads are applied thereon. The left and right torsion springs 168 surround an intermediate shaft 170 (FIG. 4). A rear free end of each of the torsion springs 168 abuts a rotatable cam 172 disposed on an intermediate shaft 174. A front free end of each torsion spring 168 is slidably connected to a corresponding slide rail 104. Turning the cam 172 adjusts an amount of preloading of the torsion springs 168. The torsion forces of the springs 168 bias the rear suspension arms 112 such that the rear suspension arms 112 tends to pivot away from the tunnel 18 about the shaft 126 (i.e. in the clockwise direction with respect to FIG. 2). It is contemplated that only one torsion spring 168 could be used.

Left and right flexible tension straps 170 are attached at their upper ends to the shaft 146, and are attached at their lower ends to the slide frame assembly 102 by a cross bar 173. The cross bar 173 extends between and is attached at its opposite ends to the front ends of the slide rails 102. The flexible tension straps 170 prevent the slide frame assembly 102 from being pushed too far away from the tunnel 18.

As best seen in FIG. 5, a pair of suspension couplers 175 is provided rearward of the rocker arm 131. It is contemplated that only one or more than two suspension couplers 175 could be provided. Each suspension coupler 175 includes a torsion spring 176 disposed around a cross bar 178 disposed between and connected to the slide rails 104. The cross bar 178 is disposed rearward of the cross bar 134 and of the pivot axis 136 of the arms 130. The torsions springs 176 are disposed side by side on the cross bar 178. The torsion springs can pivot about the cross bar 178. One end portion of each torsion spring 176 abuts the cross bar 128. Two U-shaped plates 180 are connected to the cross bar 128. The ends portions of the torsion springs 176 are received in corresponding slots defined in the U-shaped plates 180. As a result, the U-shaped plates 180 help prevent lateral movement of the springs 176. It is contemplated that instead of having slots extending therethrough, that the U-shaped plates 180 could be made of a relatively soft material, such as plastic, and have recesses defined therein to receive the portions of the springs 176. As a result, when the U-shaped plates 180 are worn, they can be easily replaced. It is contemplated that the U-shape plates 180 could be omitted and that recesses could be defined in the cross bar 128 to receive the portions of the springs 176.

The other end portion of each torsion spring 176 is received in a corresponding channel 182 defined by a cam 184. The cam 184 is defined by a hollow cross bar 186. It is contemplated that the cam 184 could be a part separate from the cross bar 186 and connected to the cross bar 186. The cross bar 186 is disposed eccentrically around a shaft 188 and can be rotated about the shaft 188. The shaft 188 is disposed between and is connected to the slide rails 104. As can be seen, the shaft 188 is disposed rearward of and vertically higher than the cross bar 178. A square insert 190 is fixed to an end of the cross bar 186. By turning the cam 184, the amount of preloading in the torsion springs 176 can be modified. To turn the cam 184, a tool, such as wrench, is used to engage and turn the square insert, which as a result turns the cross bar 186 and therefore the cam 184. It is contemplated that the insert 190 could have another shape, such as hexagonal for example. It is also contemplated that the insert 190 could be omitted and that a feature similar to the insert 190 could be provided directly on the cam 184. It is also contemplate that the cross bar 186 defining the cam 184 and the insert 190 could be omitted. In such an implementation, the torsion springs 176 would abut the shaft 188 directly. It is contemplated that in such an implementation, U-shaped plates having slots similar to the plates 180 described above could be connected on the shaft 188 to receive the portions of the torsion springs 176 therein.

Figure 7:
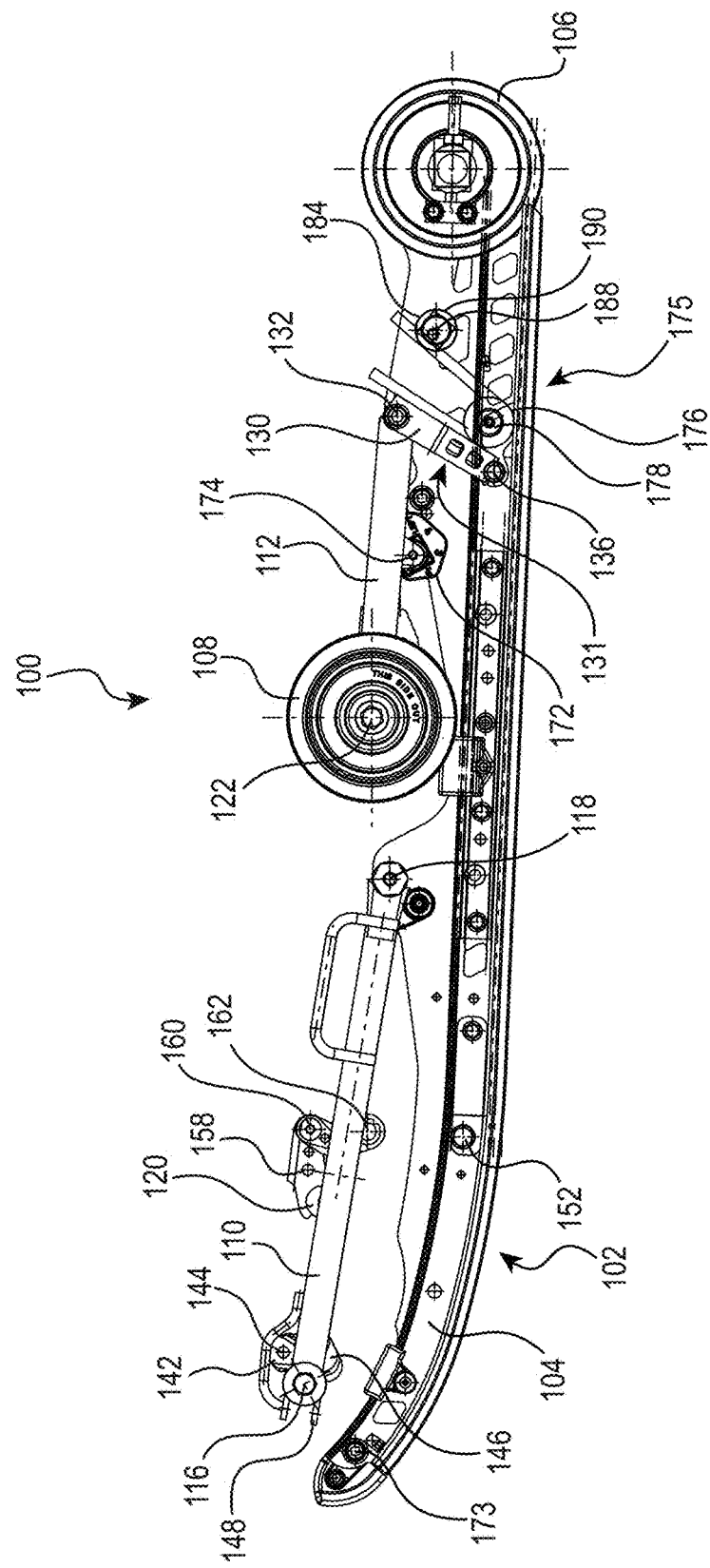
FIG. 7 is a left side elevation view of the rear suspension assembly of FIG. 2 in a fully compressed position, with the left slide rail and some other components removed for clarity.

The suspension couplers 175 generate a coupling force that continuously couples the front suspension arms 110 and the rear suspension arms 112 with each other during a full range of movement of the rear suspension 100 between the fully extended position (FIGS. 2 to 5) and the fully compressed position (FIG. 7). As can be seen by comparing FIGS. 5 (fully extended position), 6 (intermediate position), and 7 (fully compressed), as the rear suspension 100 gets compressed, the arms 130 pivot about the pivot axis 136. As the arms 130 pivot about the pivot axis 136, the cross-bar 128 moves rearward and downward and causes the front and rear ends of the torsion springs 176 to get compressed toward each other. As a result, the amount of torsion in the torsion springs 176 increases which results in an increase in the coupling force generated by the suspension couplers 175. The coupling force generated by the suspension couplers 175 has its greatest magnitude in the fully compressed position of the rear suspension assembly 100 and its smallest magnitude in the fully extended position. In the present implementation, the coupling force generated by the suspension couplers 175 increases progressively and linearly as the rear suspension assembly 100 moves from the fully extended position to the fully compressed position. The suspension couplers 175 bias the cross bar 128, and therefore the rocker arm 130, toward a front of the snowmobile 10. By turning the cam 184, the magnitude of the coupling force generated by the suspension couplers 175 can be modified. As the coupling force generated by the suspension couplers 175 increases, the front suspension arms 110 and the rear suspension arms 112 move less independently from each other.

Other implementations of suspension couplers that progressively increase the coupling force as the rear suspension assembly is compressed are contemplated. For example, the torsion springs 176 could be replaced by coil springs connected between the cross bar 128 and the cross bar 178.

Figure 8:
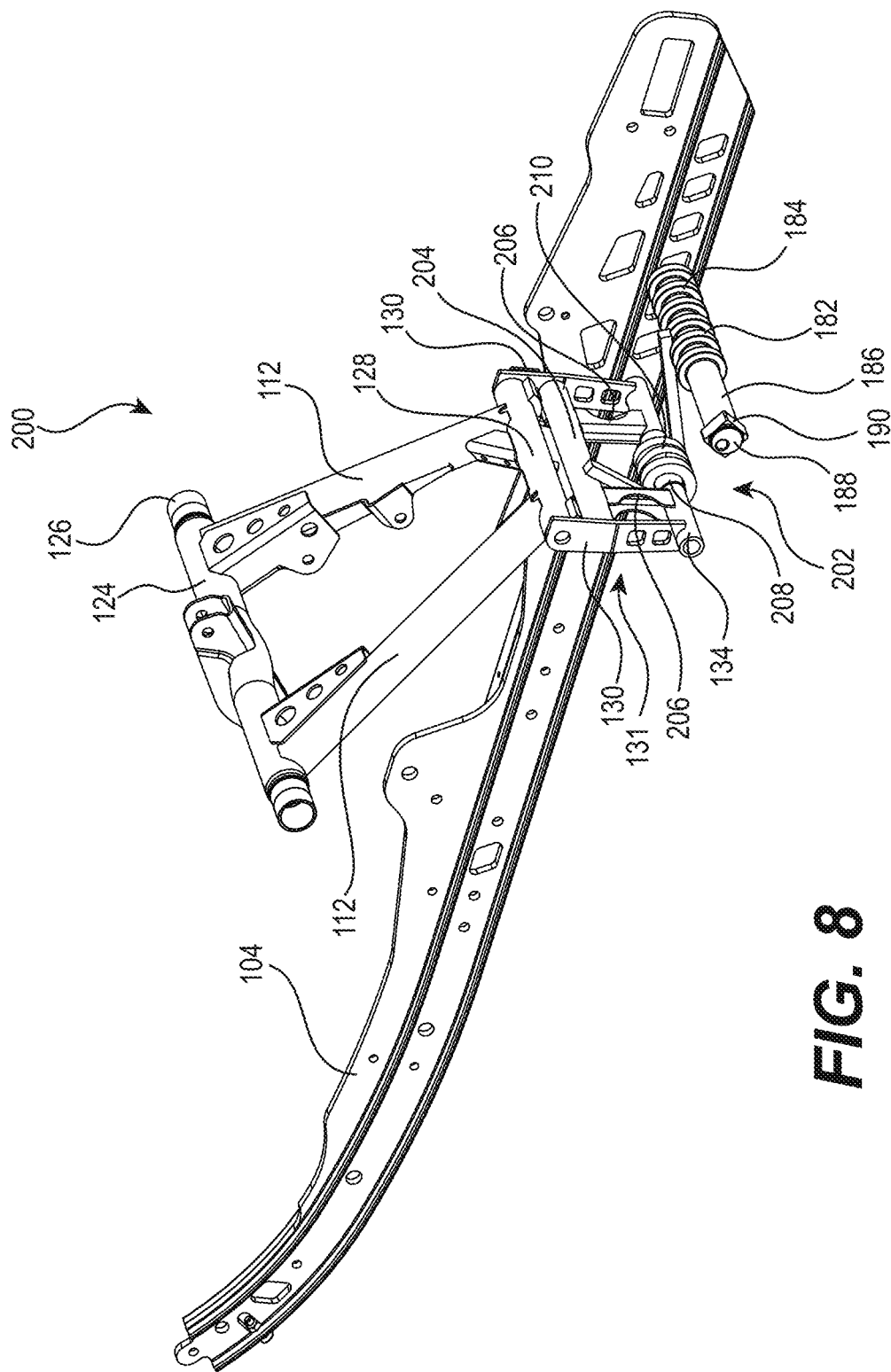
FIG. 8 is a perspective view taken from a rear, left side of some components of an alternative implementation of the rear suspension assembly of FIG. 2.

FIG. 8 illustrates parts of a rear suspension assembly 200 having a suspension coupler 202 that is another alternative implementation of the suspension coupler 175. Other than the suspension coupler 202 and some of the elements described below, the suspension assembly 200 is the same as the suspension assembly 100 and, where applicable, the elements of the suspension assembly 200 that are the same as those of the suspension assembly 100 have been labeled with the same reference numerals. In the suspension assembly 200, a cross bar 204 extends between and is connected to the arms 130. The cross bar 204 is disposed between the cross bar 128 and the cross bar 134. Legs 206 are connected between the cross bar 204 and the cross bar 128. It is contemplated that the legs 206 could be omitted. A sleeve 208 is disposed around the cross bar 128 between the legs 206. It is contemplated that the sleeve 208 could be omitted. The suspension coupler 202 has a torsion spring 210 disposed around and pivotable about the sleeve 208. One end portion of the torsion spring 210 abuts the cross bar 204. It is contemplated that U-shaped plates similar to the plates 180 described above could be provided on the cross bar 204. The other end portion of the torsion spring 210 abuts the cam 184. As can be seen, the shaft 188 is disposed vertically lower in the suspension assembly 200 than in the suspension assembly 100. As in the rear suspension assembly 100, the cam 184 can be turned to change the magnitude of the coupling force generated by the suspension coupler 202. It is contemplated that the cam 184 could be omitted. Like the suspension couplers 175 of the suspension assembly 100, the suspension coupler 202 generates a coupling force that continuously couples the front suspension arms 110 and the rear suspension arms 112 with each other during a full range of movement of the rear suspension 200 between the fully extended position and the fully compressed position, and the coupling force generated by the suspension coupler 202 increases progressively and linearly as the rear suspension assembly 200 moves from the fully extended position to the fully compressed position.

Figure 9:
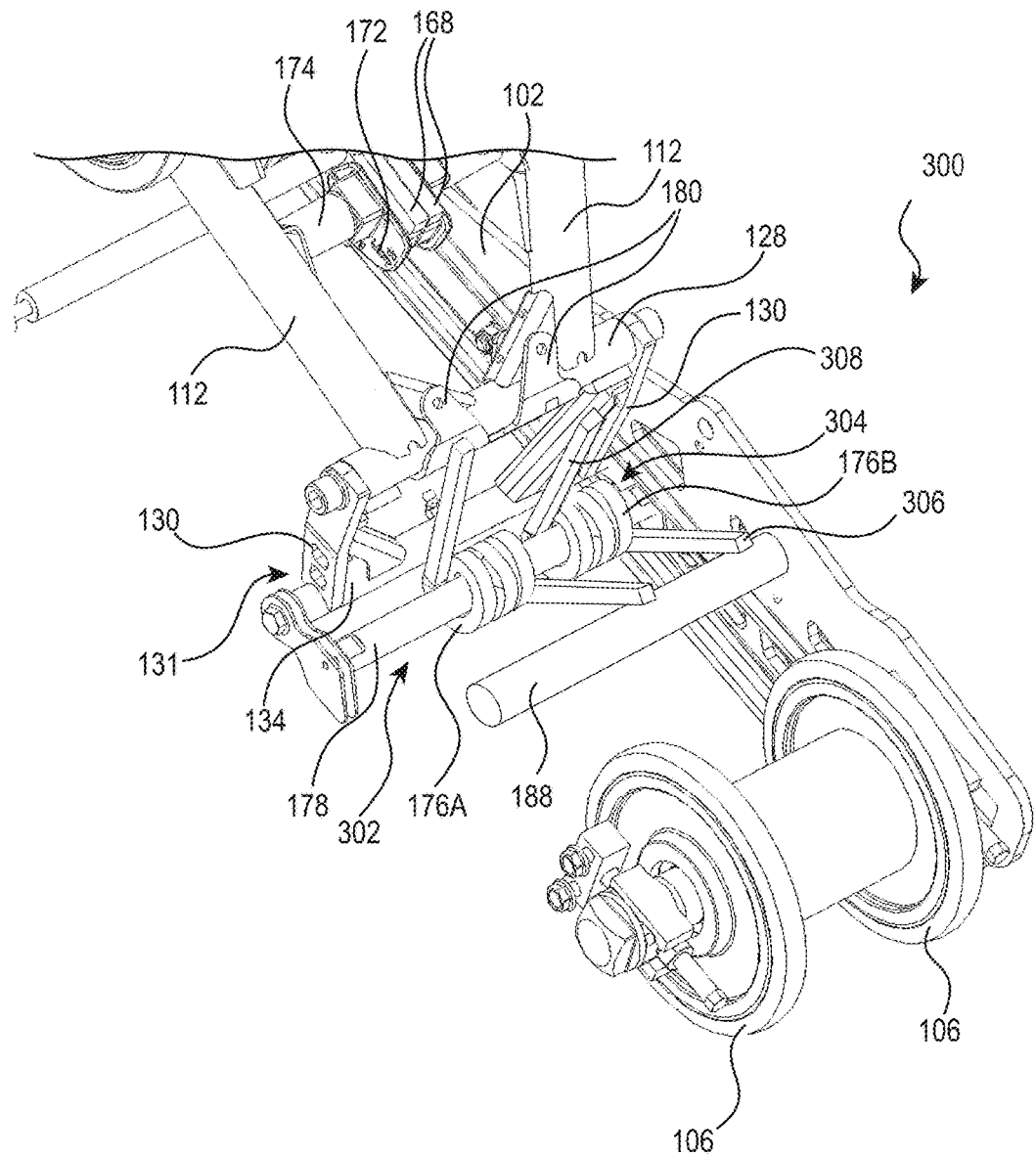
FIG. 9 is a perspective view taken from a rear, left side of some components of a portion of another alternative implementation of the rear suspension assembly of FIG. 2.

FIG. 9 illustrates parts of a rear suspension assembly 300 having suspension couplers 302, 304 that are other alternative implementations of the suspension coupler 175. Other than the suspension couplers 302 and some of the elements described below, the suspension assembly 300 is the same as the suspension assembly 100 and, where applicable, the elements of the suspension assembly 300 that are the same as those of the suspension assembly 100 have been labeled with the same reference numerals. In the suspension assembly 300, the hollow cross bar 186, the cams 184 and the square insert 190 have been removed.

The suspension coupler 302 includes a torsion spring 176A disposed around the cross bar 178. The torsion spring 176A can pivot about the cross bar 178. One end portion of the torsion spring 176A abuts the cross bar 128. The end portion of the torsion spring 176A is received in the slot defined in one of the U-shaped plates 180. The other end portion of the torsion spring 176A abuts the shaft 188. Like the suspension couplers 175 of the suspension assembly 100, the suspension coupler 302 generates a coupling force that continuously couples the front suspension arms 110 and the rear suspension arms 112 with each other during a full range of movement of the rear suspension 300 between the fully extended position and the fully compressed position.

The suspension coupler 304 includes a torsion spring 176B disposed around the cross bar 178 next to the torsion spring 176A. The torsion spring 176B can pivot about the cross bar 178. In the fully extended position of the suspension assembly 300, the end portion 306 of the torsion spring 176B abuts the shaft 188 and the end portion 308 of the torsion spring 176B is spaced from the cross bar 128. Unlike the suspension couplers 175 of the suspension assembly 100, the suspension coupler 304 only generates a coupling force that couples the front suspension arms 110 and the rear suspension arms 112 with each other once the rear suspension 300 has been sufficiently compressed for the cross bar 128 to make contact with the end portion 308 of the torsion spring 176B. Between this position and the fully compressed position, the suspension coupler 304 generates a coupling force that continuously couples the front suspension arms 110 and the rear suspension arms 112 with each other.

As a result of the suspension coupler 304 only generating a coupling force for a portion of the full range of movement of the rear suspension 300 between the fully extended position and the fully compressed position, the combined coupling force generated by the suspension couplers 302 and 304 increases progressively, but not linearly, as the rear suspension assembly 300 moves from the fully extended position to the fully compressed position. The combined coupling force will be linear over certain ranges of positions, but there will be a transition between these ranges as the cross bar 128 makes contact with the end portion 308 of the torsion spring 176B of the suspension coupler 304.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
   a chassis including a tunnel, the tunnel having a longitudinal direction;
   an engine connected to the chassis;
   at least one ski connected to the chassis by a front suspension;
   an endless drive track disposed below the tunnel and operatively connected to the engine for propulsion of the snowmobile; and
   a rear suspension assembly supporting and tensioning the endless drive track, the rear suspension assembly having a fully extended position and a fully compressed position, the rear suspension assembly including:
      a front suspension arm having an upper end and a lower end, the upper end of the front suspension arm being pivotally connected to the tunnel;
      a rear suspension arm having an upper end and a lower end, the upper end of the rear suspension arm being pivotally connected to the tunnel;
      a rocker arm having a first end pivotally connected to the lower end of the rear suspension arm;
      a pair of slide rails pivotally connected to the lower end of the front suspension arm and to a second end of the rocker arm;
      at least one shock absorber connected between the tunnel and the pair of slide rails, the at least one shock absorber biasing the pair of slide rails away from the tunnel; and
      at least one suspension coupler coupling the rear suspension arm with the front suspension arm, the at least one suspension coupler including at least one spring generating a force that progressively resists pivoting of the rocker arm toward a rear of the snowmobile through a plurality of positions relative to the pair of slide rails such that upon movement of the front portion of the pair of slide rails toward the tunnel the rear portion of the pair of slide rails is forced toward the tunnel to continuously and progressively couple the front and rear suspension arms with each other, the at least one suspension coupler biasing the first end of the rocker arm toward a front of the snowmobile through the plurality of positions.

2. The snowmobile of claim 1, wherein the coupling force increases as the rear suspension assembly moves from the fully extended position to the fully compressed position.

3. The snowmobile of claim 2, wherein the coupling force increases progressively as the rear suspension assembly moves from the fully extended position to the fully compressed position.

4. The snowmobile of claim 3, wherein the coupling force increases linearly as the rear suspension assembly moves from the fully extended position to the fully compressed position.

5. The snowmobile of claim 1, wherein the at least one spring is at least one torsion spring.

6. The snowmobile of claim 5, wherein:
   the rear suspension assembly further includes a cross bar extending between the pair of slide rails; and
   the at least one torsion spring is disposed around the cross bar and is pivotable around the cross bar.

7. The snowmobile of claim 6, wherein:
   the cross bar is a first cross bar;
   the rear suspension assembly further includes a second cross bar extending between the pair of slide rails; and
   the at least one torsion spring has a first end abutting the rear suspension arm and a second end abutting the second cross bar.

8. The snowmobile of claim 7, wherein:
   the second cross bar defines at least one cam;
   the second end of the at least one torsion spring abuts the at least one cam; and
   the at least one cam is movable to adjust a magnitude of the coupling force.

9. The snowmobile of claim 1, wherein the rear suspension assembly further comprises a pair of tie rods and a pair of torsion springs connected between the front suspension arm and the rear suspension arm.

10. The snowmobile of claim 1, wherein:
    the at least one shock absorber includes a first torsion spring; and
    the at least one spring of the at least one suspension coupler is a second torsion spring.

11. A rear suspension assembly for a snowmobile, the snowmobile having a tunnel, the rear suspension assembly having a fully extended position and a fully compressed position, the rear suspension assembly comprising:
    a front suspension arm having an upper end and a lower end, the upper end of the front suspension arm being configured to be pivotally connected to the tunnel;
    a rear suspension arm having an upper end and a lower end, the upper end of the rear suspension arm being configured to be pivotally connected to the tunnel;
    a rocker arm having a first end pivotally connected to the lower end of the rear suspension arm;
    a pair of slide rails pivotally connected to the lower end of the front suspension arm and to a second end of the rocker arm;
    at least one shock absorber configured to be connected to the tunnel and connected to the pair of slide rails, the at least one shock absorber being configured to bias the pair of slide rails away from the tunnel; and
    at least one suspension coupler coupling the rear suspension arm with the front suspension arm, the at least one suspension coupler including at least one spring generating a force that progressively resists pivoting of the rocker arm toward a rear of the snowmobile through a plurality of positions relative to the pair of slide rails such that upon movement of the front portion of the pair of slide rails toward the tunnel the rear portion of the pair of slide rails is forced toward the tunnel to continuously and progressively couple the front and rear suspension arms with each other, the at least one suspension coupler biasing the first end of the rocker arm toward a front of the snowmobile through the plurality of positions.

12. The rear suspension assembly of claim 11, wherein the coupling force increases as the rear suspension assembly moves from the fully extended position to the fully compressed position.

13. The rear suspension assembly of claim 12, wherein the coupling force increases progressively as the rear suspension assembly moves from the fully extended position to the fully compressed position.

14. The rear suspension assembly of claim 13, wherein the coupling force increases linearly as the rear suspension assembly moves from the fully extended position to the fully compressed position.

15. The rear suspension assembly of claim 11, wherein the at least one spring is at least one torsion spring.

16. The rear suspension assembly of claim 15, further comprising:
a cross bar extending between the pair of slide rails; and
wherein the at least one torsion spring is disposed around the cross bar and is pivotable around the cross bar.

17. The rear suspension assembly of claim 16, wherein the cross bar is a first cross bar;
the rear suspension assembly further comprising a second cross bar extending between the pair of slide rails; and
wherein the at least one torsion spring has a first end abutting the rear suspension arm and a second end abutting the second cross bar.

18. The rear suspension assembly of claim 17, wherein:
the second cross bar defines at least one cam;
the second end of the at least one torsion spring abuts the at least one cam; and
the at least one cam is movable to adjust a magnitude of the coupling force.

19. The rear suspension assembly of claim 11, further comprising a pair of tie rods and a pair of torsion springs connected between the front suspension arm and the rear suspension arm.

20. The rear suspension assembly of claim 11, wherein:
the at least one shock absorber includes a first torsion spring; and
the at least one spring of the at least one suspension coupler is a second torsion spring.

21. A rear suspension assembly for a snowmobile, the snowmobile having a tunnel, the rear suspension assembly having a fully extended position and a fully compressed position, the rear suspension assembly comprising:
a front suspension arm having an upper end and a lower end, the upper end of the front suspension arm being configured to be pivotally connected to the tunnel;
a rear suspension arm having an upper end and a lower end, the upper end of the rear suspension arm being configured to be pivotally connected to the tunnel;
a rocker arm having a first end and a second end, the first end of the rocker arm being pivotably connected to the lower end of the rear suspension arm;
a pair of slide rails pivotally connected to the lower end of the front suspension arm and to the second end of the rocker arm;

at least one shock absorber configured to be connected to the tunnel and connected to the pair of slide rails, the at least one shock absorber being configured to bias the pair of slide rails away from the tunnel; and at least one suspension coupler coupling the rear suspension arm with the front suspension arm, the at least one suspension coupler including at least one spring generating a force that resists pivoting of the rocker arm with the pair of slide rails such that upon movement of the front portion of the pair of slide rails toward the tunnel the rear portion of the pair of slide rails is forced toward the tunnel to continuously and progressively couple the front and rear suspension arms with each other.

22. The rear suspension assembly of claim 21, wherein the coupling force increases as the rear suspension assembly moves from the fully extended position to the fully compressed position.

23. The rear suspension assembly of claim 22, wherein the coupling force increases progressively as the rear suspension assembly moves from the fully extended position to the fully compressed position.

24. The rear suspension assembly of claim 23, wherein the coupling force increases linearly as the rear suspension assembly moves from the fully extended position to the fully compressed position.

25. The rear suspension assembly of claim 21, wherein the at least one spring is at least one torsion spring.

26. The rear suspension assembly of claim 25, further comprising a cross bar extending between the pair of slide rails; and
wherein the at least one torsion spring is disposed around the cross bar and is pivotable around the cross bar.

27. The rear suspension assembly of claim 26, wherein the cross bar is a first cross bar;
the rear suspension assembly further comprising a second cross bar extending between the pair of slide rails; and
wherein the at least one torsion spring has a first end abutting the rear suspension arm and a second end abutting the second cross bar.

28. The rear suspension assembly of claim 27, wherein:
the second cross bar defines at least one cam;
the second end of the at least one torsion spring abuts the at least one cam; and
the at least one cam is movable to adjust a magnitude of the coupling force.

29. The rear suspension assembly of claim 21, wherein the at least one suspension coupler biases the first end of the rocker arm toward a front of the rear suspension assembly.

30. The rear suspension assembly of claim 21, further comprising a pair of tie rods and a pair of torsion springs connected between the front suspension arm and the rear suspension arm.

31. The rear suspension assembly of claim 21, wherein:
the at least one shock absorber includes a first torsion spring; and
the at least one spring of the at least one suspension coupler is a second torsion spring.

* * * * *